United States Patent [19]
De Bergh et al.

[11] 3,849,716
[45] Nov. 19, 1974

[54] VOLTAGE CONVERTER
[75] Inventors: Guy De Bergh, Sceaux; Jean Fontaine, Montrouge, both of France
[73] Assignee: Societe Alsacienne de Constructions Atomiques de Telecommunications et d'Electronique (Alcatel), Paris, France
[22] Filed: Sept. 18, 1972
[21] Appl. No.: 289,917

Related U.S. Application Data
[63] Continuation of Ser. No. 104,948, Jan. 8, 1971, abandoned.

[30] Foreign Application Priority Data
Jan. 9, 1970 France ........................ 70.00704

[52] U.S. Cl. .................................................. 321/2
[51] Int. Cl. ........................................... H02m 3/32
[58] Field of Search ...................................... 321/2

[56] References Cited
UNITED STATES PATENTS

| 3,114,096 | 12/1963 | Projain | 321/2 |
| 3,202,902 | 8/1965 | Glass | 321/2 |
| 3,413,576 | 11/1968 | Shehan | 307/297 X |
| 3,569,816 | 3/1971 | Marzolf | 321/2 |
| 3,639,826 | 2/1972 | Grundberg | 321/2 |

Primary Examiner—William M. Shoop, Jr.
Attorney, Agent, or Firm—Sughrue, Rothwell, Mion, Zinn & Macpeak

[57] ABSTRACT

Voltage increasing converter having a very small volume, supplying a continuous voltage in the order of about 10 volts regulated accurately from a continuous voltage supply which can be less than one volt, the regulation being ensured by a negative-reaction circuit having a variable resistor, which consists of the drain-source path of a field-effect transistor.

1 Claim, 3 Drawing Figures

PATENTED NOV 19 1974          3,849,716

VOLTAGE CONVERTER

REFERENCE TO RELATED APPLICATIONS

This application is a continuation of application Ser. No. 104,948, filed Jan. 8, 1971 and now abandoned.

BACKGROUND OF THE INVENTION

1. Field of the Invention

The present invention concerns a voltage converter which is able to provide a unidirectional output voltage of approximately 10 volts from a direct current source operating at less than 1 volt. The invention provides a converter in which starting and regulation of the output voltage are automatic.

2. Description of Prior Art

Many arrangements have already been proposed for providing from small cells or batteries providing only a few volts a direct output current at power levels of the order of some few hundred microwatts.

In such devices, the primary winding of a transformer is generally connected to the terminals of the cell or battery. In series with the primary winding is an element arranged to open the circuit at a particular frequency. The load circuit is connected to the secondary winding of the transformer through a diode. Initially, microvibrators were used as the element interrupting the current, an early application being to the high tension supplies of infra-red image converter tubes.

More recently, the switching element has been replaced by a transistor circuit, the current variation in the primary winding of the transformer being obtained by varying the conductivity between the collector and emitter of the transistor by a polarizing circuit connected to its base.

Such devices are simple and robust but are not able to provide regulation of the output voltage should the load conditions change. Where regulation is required, it is therefore necessary to add on a separate regulation circuit. This consumes power, so reducing the overall efficiency of the converter which is always disadvantageous when the power levels in question are of the order of a few hundred microwatts.

Furthermore, such devices have generally required a separate triggering network for switching them on, involving further power wastage. To economize on power, it has thus been necessary to disconnect the trigger network after each triggering of the converter, so that the use of such devices has had to be manually controlled.

The previously proposed converters have generally been bulky, usually with a volume in excess of 10 cm$^3$.

The overall efficiency of the previously proposed converters rarely exceeds some 50 per cent because of the losses already mentioned.

SUMMARY OF THE INVENTION

In accordance with the invention, a voltage converter comprises an input circuit for connection to a unidirectional voltage source and including a first winding of a three-winding transformer in series with the collector-emitter junction of a transistor, an output circuit from which is obtained a unidirectional output voltage, including a second winding of the transformer in series with a diode; and a feedback circuit comprising the third winding of the transformer connected in series with a variable resistance element between the input circuit and the base of the transistor, a control input of the variable resistance element being connected to the output circuit to sense the unidirectional output voltage.

Thus the base of the transistor is in a feedback loop including an element whose resistance varies and depends directly on the output voltage of the converter. Regulation of the output voltage is thus obtained with a high overall efficiency, whilst triggering of the converter is economically obtained.

BRIEF DESCRIPTION OF THE DRAWING

The invention will now be described in more detail, by way of examples only, and with reference to the accompanying diagrammatic drawing in which.

DETAILED DESCRIPTION OF THE PREFERRED EMBODIMENT

Figure 1:
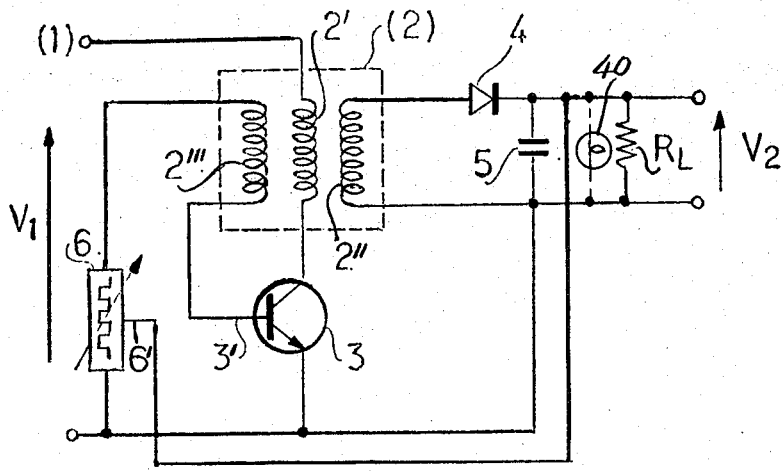
FIG. 1 is a schematic circuit diagram showing the principal used in a voltage converter.

Referring to FIG. 1, a voltage converter has an input circuit for connection to a unidirectional voltage source shown symbolically at (1), this input circuit including a first winding 2' of a three-winding transformer 2 in series with the collector-emitter junction of an NPN transistor 3.

The converter has an output circuit which applies a unidirectional output voltage $V_2$ to a load resistance $R_L$, the output circuit including a second winding 2'' of the transformer 2 connected in series with a diode. The series-combination of the winding 2'' and the diode 4 shunts the load resistance $R_L$ which is in turn shunted by a capacitance 5.

A feedback circuit includes the winding 2''' of the transformer 2 connected in series with a variable resistance element 6 between the base 3' of the transistor 3 and one terminal of the unidirectional voltage source (1). This source provides a unidirectional input voltage $V_1$.

The terminal of the source to which is connected the element 6 is also connected to the emitter of the transistor 3 and to one terminal of the load $R_L$. The other terminal of the load $R_L$ is connected to a control input 6' of the variable resistance element 6.

The converter operates as follows: when the base 3' of the transistor 3 is biased positive, the collector-emitter junction conducts and the collector current increases linearly with time, the voltage applied to the first winding 2' of the transformer 2 being constant.

The current flowing in the feedback circuit is created by the substantially constant voltage across the winding 2'''. This current is limited by the sum of the resistance of the element 6 and the base-emitter resistance of the transistor 3.

After a very short time interval, determined by the resistance value of the element 6, the base current of the transistor 3 is not sufficient to saturate the transistor. The maximum collector current available in the transistor 3 then becomes equal to the base current multiplied by the current gain. The current flowing in the winding 2' is limited to this value.

The voltage across the winding 2' decreases so that the current in the feedback circuit decreases reducing the bias on the base of the transistor 3 which cuts off. The energy stored in the winding 2' passes into the winding 2'' and so through the diode 4 into the network made up by the capacitance 5 and the load resistance $R_L$.

The current in the diode 4 then decreases, tending towards zero. When this current disappears, there appears in the winding 2" a magnetic flux which induces a current in the winding 2''' sufficient to bias the transistor 3 into conduction. A second and subsequent identical cycles then follow.

Regulation of the output voltage $V_2$ obtained across the load resistance $R_L$ is assured by the variable resistance element 6 which senses the output voltage. If the load resistance decreases the voltage $V_2$ tends to diminish. The feedback circuit responds to this decrease in the load voltage by decreasing the resistance value of the element 6, so increasing the voltage on the base of the transistor 3 to increase the maximum collector current. This tends to increase the load voltage $V_2$, which is consequently regulated to a substantially constant value.

Any fall in the load voltage $V_2$ brings about a decrease in the resistance of the element 6, so prolonging the increase of current in the winding 2'. This increases the energy supplied to the load circuit, increasing the voltage across the load $R_L$. This voltage regulation is obtained with negligible energy loss since the element 6 wastes very little power. Starting of the converter is automatically assured each time that the load voltage $V_2$ becomes zero.

Depending on the resistance value of the element 6, the frequency of oscillation obtained in the converter is between 10 Hz and 50 KHz. It has been found that satisfactory coupling between the windings of the transformer 2 is obtained with frequencies between 1 and 30 KHz.

Figure 2:
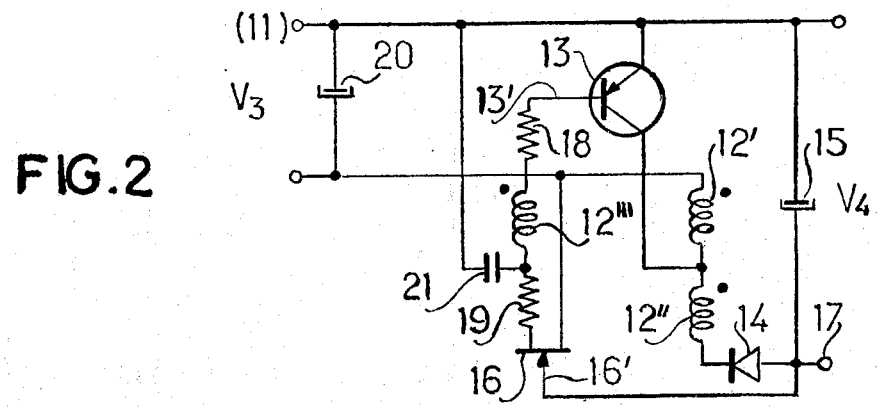
FIG. 2 is a practical embodiment converter.

FIG. 2 shows a first practical embodiment of the converter, in which the variable resistance element 6 is a field effect transistor, either a junction or MOS transistor.

The direct current source is shown symbolically at (11) and provides a unidirectional input voltage $V_3$. A first winding 12' of a three-winding transformer is connected in series with the collectoremitter junction of a PNP transistor 13 across the source (11). The base 13' of the transistor 13 is connected to the same terminal of the source (11) as the emitter through a resistance 18, a winding 12''' of the transformer, and a decoupling capacitance 21.

The base 13' is also connected to the other terminal of the source (11) through resistance 18, winding 12''', a further resistance 19, and the source-drain junction of a field effect transistor 16'.

The collector of the transistor 13 is connected through winding 12" of the transformer and a diode 14 to an output terminal 17 of the converter. The other output terminal is connected to the emitter of transistor 13, and a high-value capacitance 15 is connected between the output terminals. A load (not shown) is connected between the output terminals to receive the unidirectional output voltage $V_4$ of the converter. Terminal 17 is connected to the gate 16' of the transistor 16.

A high-value capacitance 20 shunts the source (11). The values of the bias and filter resistors 18 and 19 are low to avoid unwanted power wastage.

The operation of this circuit is exactly as described for FIG. 1. The energy losses are limited because the control circuit at the gate of transistor 16 wastes very little power. With this circuit, it is possible to obtain an overall efficiency of the order of 80 per cent for an input voltage of 0.5 volts. Using silicon transistors in this circuit, converters have been constructed providing an output voltage adjustable between 5 and 7 volts at a power level of 400 microwatts, with input voltages between 0.3 and 1 volt and an overall volume of 4 cm$^3$.

The operating frequency is of the order of 20 KHz, the output voltage regulation being such that power variations of 25 per cent cause output voltage variations of the order of 1 per cent. The converters are able to withstand short circuits with immediate automatic restarting on return to the initial conditions.

Converters such as just described find many applications where a small and light voltage source is required to provide a stable output voltage. The converter is particularly, but not exclusively, suitable for converting the small voltages produced by thermo-electric sources into a stable output voltage. Such sources generally derive their energy from a nuclear heat source, solar energy, or a light source. The converters are thus suitable, for example, for use with heart stimulation devices as well as for numerous aerospace applications.

Using the invention it is possible to provide a voltage converter taking its energy from a unidirectional voltage source providing some tenths of a volt and providing a reliable and well-regulated output voltage of some 10 volts at a power level of some few hundred microwatts.

Where the load circuit for the converter includes a light source 40, the variable resistance element (6 in FIG. 1) suitably consists of a photo-resistive cell arranged to be illuminated by the source.

Although the invention has been described with respect to a preferred embodiment thereof it is understood by those skilled in the art that various modifications can be made in construction and arrangement within the scope of the invention as defined in the appended claims.

What is claimed is:

1. In a heart stimulation device; a low voltage converter supplying very low power, comprising a unidirectional low voltage source of one volt or less, a three-winding transformer, an input circuit for connection to said unidirectional low voltage source and including a first winding of said three-winding transformer and a transistor, said first winding being connected in series with the collector-emitter junction of said transistor, an output circuit from which is obtained a unidirectional output voltage, including a second winding of the transformer, and a diode, said second winding being connected in series with said diode, and a feedback circuit comprising a single active element only in the form of a field effect transistor and the third winding of the transformer, the source-drain circuit of said field effect transistor being connected in series with said third winding, the gate of said field effect transistor being connected directly to the output circuit to directly provide a control input to the field effect transistor in accordance with the unidirectional output voltage.

* * * * *